(12) United States Patent
Szoke, Jr.

(10) Patent No.: US 10,375,941 B2
(45) Date of Patent: Aug. 13, 2019

(54) FLEXIBLE MULTI-ARMED (MATCH THE HATCH) FISHING LURE WITH A CHANGEABLE REAR WEIGHT

(71) Applicant: John Andrew Szoke, Jr., Abbeville, SC (US)

(72) Inventor: John Andrew Szoke, Jr., Abbeville, SC (US)

( * ) Notice: Subject to any disclaimer, the term of this patent is extended or adjusted under 35 U.S.C. 154(b) by 364 days.

(21) Appl. No.: 15/330,457

(22) Filed: Sep. 22, 2016

(65) Prior Publication Data

US 2017/0181415 A1 Jun. 29, 2017

Related U.S. Application Data

(60) Provisional application No. 62/282,767, filed on Aug. 10, 2015.

(51) Int. Cl.
*A01K 85/00* (2006.01)
*A01K 91/04* (2006.01)
*A01K 91/053* (2006.01)

(52) U.S. Cl.
CPC .............. *A01K 85/00* (2013.01); *A01K 91/04* (2013.01); *A01K 91/053* (2013.01)

(58) Field of Classification Search
CPC ....... A01K 85/00; A01K 91/04; A01K 91/053
See application file for complete search history.

(56) References Cited

U.S. PATENT DOCUMENTS

| 1,352,979 | A | * | 9/1920 | Lawrence | A01K 91/053 43/42.74 |
|---|---|---|---|---|---|
| 2,769,270 | A | * | 11/1956 | Williams | A01K 91/053 43/42.74 |
| 3,646,700 | A | * | 3/1972 | Pond | A01K 91/053 43/42.74 |
| 3,878,636 | A | * | 4/1975 | George | A01K 91/053 43/42.74 |
| 4,893,432 | A | * | 1/1990 | Rosengrant | A01K 91/053 43/42.74 |
| D364,444 | S | * | 11/1995 | DeCosta | D22/129 |
| D707,326 | S | * | 6/2014 | Moehring | D22/129 |
| D707,787 | S | * | 6/2014 | Moehring | D22/129 |

(Continued)

FOREIGN PATENT DOCUMENTS

GB 687010 A * 2/1953 ............. A01K 91/04

OTHER PUBLICATIONS

How to Rig an Umbrella Rig for Cover Fishing; Wired2Fish Dec. 28, 2015 printed Mar. 6, 2019 https://www.youtube.com/watch?v=oF19-pEZBLU (Year: 2015), at :58+.*

*Primary Examiner* — Christopher R Harmon

(57) ABSTRACT

The invention relates to a fishing lure made up of an epoxy resin head where the fishing line will connect, a number of flexible stainless steel camouflage wire arms coming out the center backside of the head horizontally to create different width spreads on the lure. These flexible wire arms eventually bend downward to create the height of the lure, or the vertical arms with staggered lengths to them. A number of different baits can be attached to each individual arm. The flexibility of the wire arms allows adjustment of lure to keep its original shape. A center arm with multiple sized changeable weights to the far rear of invention, and the advantage of adding another bait on the end after the weight.

5 Claims, 3 Drawing Sheets

(56) References Cited

U.S. PATENT DOCUMENTS

Figure 1:
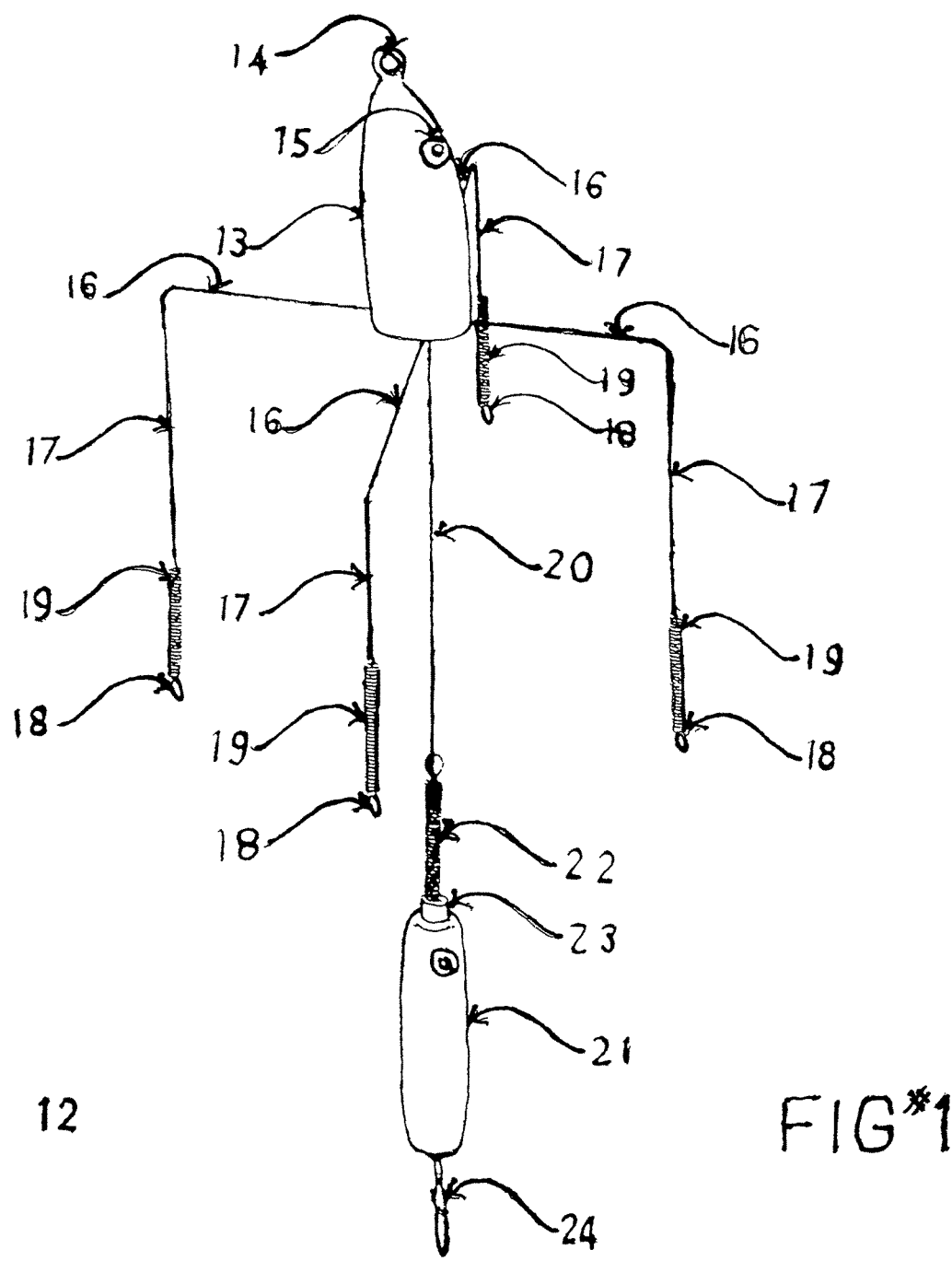

| | | | |
|---|---|---|---|
| 2005/0050790 A1* | 3/2005 | Higgins | A01K 91/053 43/42.74 |
| 2012/0073182 A1* | 3/2012 | Poss | A01K 85/00 43/42.13 |
| 2015/0096220 A1* | 4/2015 | Buhler | A01K 85/00 43/42.11 |
| 2016/0235047 A1* | 8/2016 | Mirabal | A01K 85/10 |

* cited by examiner

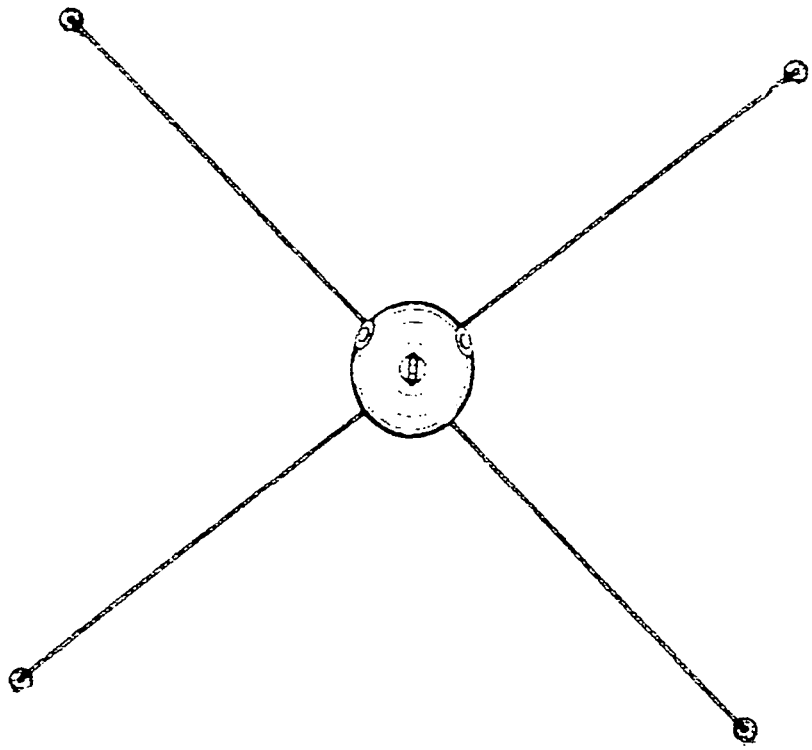
12  FIG*2

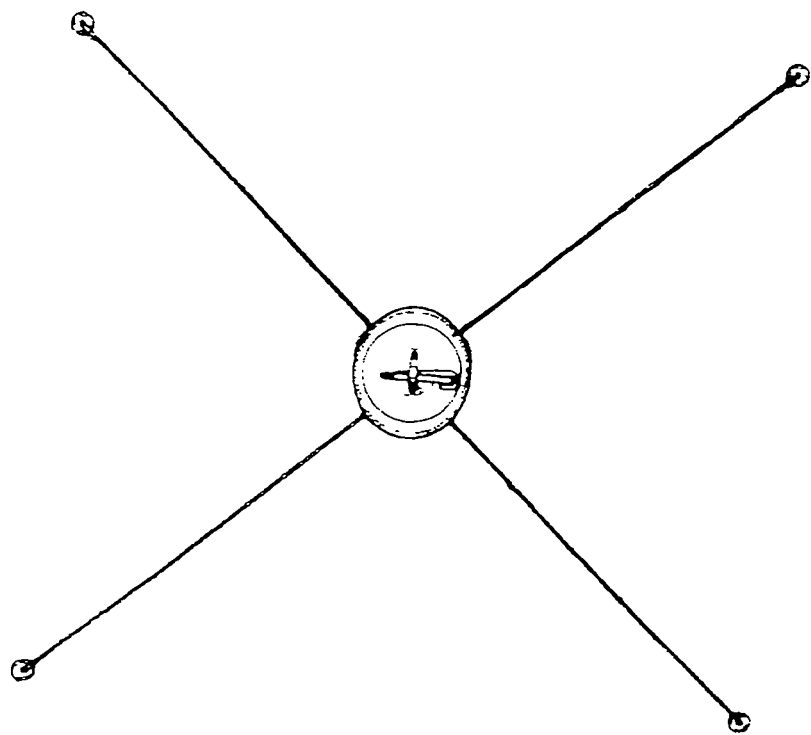
12  FIG*3

FLEXIBLE MULTI-ARMED (MATCH THE HATCH) FISHING LURE WITH A CHANGEABLE REAR WEIGHT

FIELD OF INVENTION

The invention directly relates to a fishing device with multiple arms of flexible stainless steel wire to connect baits to, with a changeable weight to the rear of lure.

BACKGROUND ART

A fishing device with a number of items used for hooking and attracting fish. It can be made up of hooks, sinkers, lures, swivels, beads, and other tackle for fishing. For many decades a device with multiple rigged wire arms, with baits attached to each arm has been dragged at a distance behind a boat through the water to attracted and catch fish. this is the art of trolling with an umbrella rig. The rigidness of the wire arms telescoping outward from the center make it impossible to cast. I always thought a smaller multi armed lure that could be cast from a rod and reel should be made.

SUMMARY OF INVENTION

This lure has 4 flexible outer arms that can be adorned on there ends with different baits to imitate a school of bait fish. The fifth flexible arm which is the center arm is the longest. When the last bait is attached it imitates a bait fish trying to catch up to the others. The center arm also plays a very important part. This arm has a changeable weight so you can target the depth the fish are at, and the weight being at the far rear makes this lure a joy to cast and tangle free. Because the weight is facing the direction you are casting it does not have to turn around in mid-air as the ones with the weight to the front at the head do.

This whole point of this invention is to keep the lure tangle free with the spread and staggers on all the arms. Less tangle more time with the lure in the water catching fish.

DETAILED DESCRIPTION OF DRAWINGS

A multi armed fishing lure with 4 flexible horizontal wire arms telescoping outward from the rear center of the epoxy head to create the spread on the lure to keep baits separated. After a short distance the arms turn downward to make up the vertical arms with a stagger in them to keep baits separated from each other when casting and retrieving lure. The flexible wire lets you keep lure in its original shape and to reshape whenever needed FIG. 1. Shows an angled view of five arm invention with weight to rear.

FIG. 2. Shows frontal view of five arm lure.

FIG. 3. Shows tail end view of five arm lure

SPECIFICATIONS OF INVENTION

The fishing lure invention will be number 12. The head 13 that is made out of epoxy resin that bounds and encapsulates all the flexible stainless steel wire arms, and is lighter in weight. This is the first important fact of this invention less weight in the front and all the weight in the rear makes casting and retrieving the lure tangle free. Head 13 will also be painted to imitate bait fish, have holographic eyes 15 and an eyelet 14 in the front to connect lure 12 to line from fishing pole. At the back of head 13 there are multiple flexible stainless steel arms 16 that make up the important outward spread on lure. The spread would be in a ½ inch increment graduation depending on lure type. These arms telescope outward in all directions from the back center of head 13 to there various distance depending on lure type, then makes a 90 degree turn downward to form the vertical arms 17 on lure. The outward spread on lure invention is the second important fact about this invention. The spread from the back center of head outward each way keep swim baits separated from each other and tangle free. Vertical arms 17 will have a stagger in them, with the measurements that follow. A lure 12 that will have 1½ inch swim baits attached to the end of arms has a 1½ inch stagger in the vertical arms 17. Every other arm would be 1½ inch longer or shorter to create the stagger. Depending on which lure 12 type, the stagger will increase in ½ inch increments up to 5 inches on the biggest model made. The stagger in the vertical arms 17 is the third important fact about this invention. The stagger keeps the baits vertically away from each other and tangle free, Vertical arms 17 will also be of different starting lengths after the 90 degree bend, not including the staggers depending on swim bait lengths. All the arms are made out of 0.024 to 0.051 thousands thick stainless steel camouflage wire and a formed eyelet 18 at the end with a coiled stainless steel spring 19 to hold them closed and to open them. This spring allows the fisher person to quickly change to the bait needed to match size, color, and shape of bait fish present at that time. (MATCH the HATCH) Slide spring up arm to open, push down to close. This is the fourth important fact about this invention.

Center arm 20 connects all the flexible arms 16 to a coil formed on the upper end of the arm. Then epoxy resin is casted around them to bound them together and form the head 13. Center arm 20 also forms the eyelet 14 at the front of head 13, and to the far rear also holds on the different sized changeable weights 21 (from ¼ ounces to 4 ounces), and connects the last swim bait which is changeable too. With this weight 21 being at the very end of lure 12 the fisher person will not have to deal with line wrap around the vertical arms 17. The weight 21 is already facing the way you are casting. This is the fifth important fact of invention On other multiple arm lures with the weight being in the front when you cast the lure has to turn over in flight wrapping the arms. There is a stainless steel weight retaining spring 22 on center arm 20 with a bead 23 that holds tension on weight 21 when different size weights 21 are used. The pressure also pushes against the snap 24 at back of lure 12 which does two things. First: open and take off snap 24 to remove and change size of weight 21 then replace snap to hold new weight 21 on. Second: The snap 24 also connects the center swim bait to lure 12. Center arm 20 also has a stagger. It will be 1½" to 5" longer in ½" increments than the longest vertical arm 17 depending on size of swim baits. This keeps the center bait separated and tangle free, and is the sixth important fact of this invention.

What is claimed:
1. A castable fishing lure comprising;
    a head that connects to a line with a straight center arm extending rearwardly ending in a formed eyelet at a distal end;
    a plurality of opposing flexible wire arms that equally extend outwards from said head;
    said opposing wire arms comprising a 90 degree bend defining proximate and distal portions; each said distal portion comprising a formed eyelet for attaching a bait lure;

each said formed eyelet is configured to be opened by a sliding coil spring positioned over each respected arm distal portion and slidable in an axial direction;

said center arm extends at a greater distance than each said plurality of arms with a changeable inline weight positioned at the distal end between a coil spring and an attachment snap for releasably, holding said weight in position and providing an attachment point for a bait lure;

wherein said bait lures when attached to said eyelets are configured as a school of bait fish at different staggered lengths.

2. The castable fishing lure of claim 1, wherein said changeable weight is interchangeable with weights of various sizes and colors.

3. The castable fishing lure of claim 1, wherein said proximate portion and staggered lengths correspond to attached bait lure lengths.

4. The castable fishing lure of claim 1, wherein said attached bait lure lengths are from 1½ inches to 5 inches.

5. The castable fishing lure of claim 1, wherein each said distal portion length presents a stagger which corresponds to an attached bait lure length.

* * * * *